US010699315B2

(12) United States Patent
Kim et al.

(10) Patent No.: US 10,699,315 B2
(45) Date of Patent: Jun. 30, 2020

(54) METHOD AND COMPUTER PROGRAM FOR DISPLAYING SEARCH INFORMATION

(71) Applicant: ODD CONCEPTS INC., Seoul (KR)

(72) Inventors: Jung Tae Kim, Seoul (KR); Jae Yun Yeo, Seoul (KR)

(73) Assignee: ODD CONCEPTS INC., Seoul (KR)

( * ) Notice: Subject to any disclaimer, the term of this patent is extended or adjusted under 35 U.S.C. 154(b) by 250 days.

(21) Appl. No.: 15/415,791

(22) Filed: Jan. 25, 2017

(65) Prior Publication Data
US 2017/0132687 A1  May 11, 2017

Related U.S. Application Data

(63) Continuation of application No. PCT/KR2015/007815, filed on Jul. 27, 2015.

(30) Foreign Application Priority Data

Jul. 25, 2014 (KR) .................. 10-2014-0094531
Jun. 5, 2015 (KR) .................. 10-2015-0080152
Jul. 27, 2015 (KR) .................. 10-2015-0105758

(51) Int. Cl.
G06Q 30/00 (2012.01)
G06Q 30/06 (2012.01)
(Continued)

(52) U.S. Cl.
CPC ......... G06Q 30/0625 (2013.01); G06F 16/00 (2019.01); G06F 16/3331 (2019.01);
(Continued)

(58) Field of Classification Search
CPC .................. G06Q 30/0601–0645; G06Q 30/08
(Continued)

(56) References Cited

U.S. PATENT DOCUMENTS

2009/0102859 A1   4/2009  Athsani et al.
2013/0275411 A1*  10/2013  Kim .................. G06F 17/30277
                                                              707/722
(Continued)

FOREIGN PATENT DOCUMENTS

KR   10-2006-0122791 A   11/2006
KR   10-2009-0109215 A   10/2009
(Continued)

OTHER PUBLICATIONS

Brauner, Diane, Braigo Companion: iOS app that reads the text embedded in a photo, Perkinselearning, accessed at [https://www.perkinselearning.org/technology/blog/braigo-companion-ios-app-reads-text-embedded-photo ] (Year: 2016).*

(Continued)

Primary Examiner — Jeffrey A. Smith
Assistant Examiner — Lindsey B Smith

(57) ABSTRACT

The preset invention relates to a method for an electronic device to display shopping information, which includes: displaying a shopping information search menu to be fixed in a notification list; running a camera function and displaying a camera preview image upon receiving a user request for a camera search in the shopping information search menu; extracting a search image from the preview image to transmit a query; and displaying shopping information matched to the image by switching a screen or displaying a link to the shopping information to be superposed on the preview image upon receiving the shopping information.

6 Claims, 11 Drawing Sheets

(51) Int. Cl.
    *G06F 16/951*     (2019.01)
    *G06F 16/33*     (2019.01)
    *G06F 16/00*     (2019.01)

(52) U.S. Cl.
    CPC ....... *G06F 16/951* (2019.01); *G06Q 30/0623* (2013.01); *G06Q 30/0641* (2013.01); *G06Q 30/0643* (2013.01)

(58) Field of Classification Search
    USPC ............................................. 705/26.1–27.2
    See application file for complete search history.

(56) References Cited

U.S. PATENT DOCUMENTS

2013/0332317 A1* 12/2013 Boncyk ............. G06F 17/30247
                                              705/26.62
2017/0351665 A1* 12/2017 Kim ...................... G06F 17/289

FOREIGN PATENT DOCUMENTS

| KR | 10-2010-0027722 A | 3/2010 |
| KR | 10-2010-0044669 A | 4/2010 |
| KR | 10-2011-0017171 A | 2/2011 |
| KR | 10-2014-0127507 A | 11/2014 |
| KR | 10-1511050 B1 | 4/2015 |
| WO | WO 2014/077466 A1 | 5/2014 |

OTHER PUBLICATIONS

International Search Report for International Patent Application No. PCT/KR2015/007815 filed Jul. 27, 2015.

* cited by examiner

METHOD AND COMPUTER PROGRAM FOR DISPLAYING SEARCH INFORMATION

CROSS REFERENCE PARAGRAPH

The present application is a by-pass continuation of International Patent Application No. PCT/KR2015/007815 filed Jul. 27, 2015, which claims priority to and the benefit of Korean Patent Application Nos. 10-2014-0094531, 10-2015-0080152, and 10-2015-0105758 filed in the Korean Intellectual Property Office on Jul. 25, 2014, Jun. 5, 2015, and Jul. 27, 2015, the entire contents of which are incorporated herein by reference.

TECHNICAL FIELD

The present invention relates to a method and an apparatus for offering search information in an electronic device.

More particularly, the present invention relates to a method and an apparatus for acquiring a query for a shopping information search by a user's intuitive manipulations on a mobile terminal and for displaying shopping information including a related product, service, and advertisement.

BACKGROUND ART

In a recent growing wired/wireless Internet environment, online promotions, business transactions or trading are boosted. Once consumers discover any product that the consumers like while searching for magazines, blogs, or YouTube videos on an Internet-connected desktop or mobile terminal, the consumers retrieve a product name to purchase the product. The brand of a bag carried by a famous actress to the airport or the name of a baby product shown on a TV show ranks top on the real-time searching word list of a portal site. However, a user needs to individually open a webpage to search and to retrieve a product name and a store, sometimes having difficulty in finding a product without a product name.

Sellers spend a lot of money not only on commercials but on media sponsorship and the collection of online consumer reviews in order to promote products, since word-of-mouth online advertising functions as an important factor for the sale of products. However, it is frequently not allowed to release product information including a product name and a store despite paying promotional expenses because it is impossible to obtain prior approvals for the display of a product name from individual media viewers, thus bringing about an indirect advertisement issue.

There is a need from both a user and a seller for shopping information on an online product image that is offered in an intuitive user interface (UI) environment.

DETAILED DESCRIPTION OF THE INVENTION

Technical Problem

The present invention has been made in order to solve the above-mentioned problems. In particular, an aspect of the present invention is to provide a method and an apparatus for providing an intuitive user interface for a shopping information search in an electronic device and for efficiently providing shopping information including related price information, online store site information, advertisement information, coupon information, and promotion information.

Technical Solution

According to an exemplary embodiment of the present invention, a method for displaying shopping information by an electronic device includes: displaying a shopping information search menu to be fixed in a notification list; running a camera function and displaying a camera preview image upon receiving a user request for a camera search in the shopping information search menu; extracting a search image from the preview image to transmit a query; and displaying a link to shopping information matched to the image to be superposed on the preview image upon receiving the shopping information.

According to another exemplary embodiment of the present invention, a method for displaying shopping information by an electronic device includes: displaying a shopping information search menu including at least one or more search options to be fixed in a notification list; running a text input function and transmitting a shopping information search request query about a received text when receiving a user request for a text search in the shopping information search menu; running a voice input function, converting a received voice into a text, and transmitting a shopping information search request query about the converted text when receiving a user request for a voice search in the shopping information search menu; and displaying matching shopping information.

According to still another exemplary embodiment of the present invention, a method for displaying shopping information by an electronic device includes: transmitting a screenshot via a shopping information search request query when the screenshot is generated; and displaying a link to shopping information on the screenshot to be superposed on the screenshot or displaying the shopping information by switching from the screenshot to a matching shopping information display screen when the shopping information on the screenshot is received.

According to an exemplary embodiment of the present invention, an application stored in a medium that displays shopping information in an electronic device performs: a function of displaying a shopping information search menu to be fixed in a notification list; a function of running a camera function and displaying a camera preview image upon receiving a user request for a camera search in the shopping information search menu; a function of extracting a search image from the preview image to transmit a query; and a function of displaying a link to shopping information matched to the image to be superposed on the preview image upon receiving the shopping information.

According to an exemplary embodiment of the present invention, an electronic device for displaying shopping information includes: a display configured to display a user interface; and a controller configured to: display a shopping information search menu to be fixed in a notification list; run a camera function and display a camera preview image upon receiving a user request for a camera search in the shopping information search menu; extract a search image from the preview image to transmit a query; and display a link to shopping information matched to the image to be superposed on the preview image upon receiving the shopping information.

According to an exemplary embodiment of the present invention, a method for providing shopping information by a server to a client includes: generating a database of a plurality of products and extracting feature information on an image included in the database; receiving a query from the client; dividing and converting objects of characters or numbers from the query into a text; determining a product or service matched to the query using the text; and offering search information on the matched product or service to the client.

Effects of the Invention

According to the present invention, an electronic device may display a shopping information search menu to be fixed in a notification list, and a user may be provided with related shopping information through the search menu even though any function is performed in the electronic device. Therefore, convenience in shopping may be improved for purchasers, while advertising effects may be increased for sellers.

MODE FOR CARRYING OUT THE INVENTION

Figure 1:
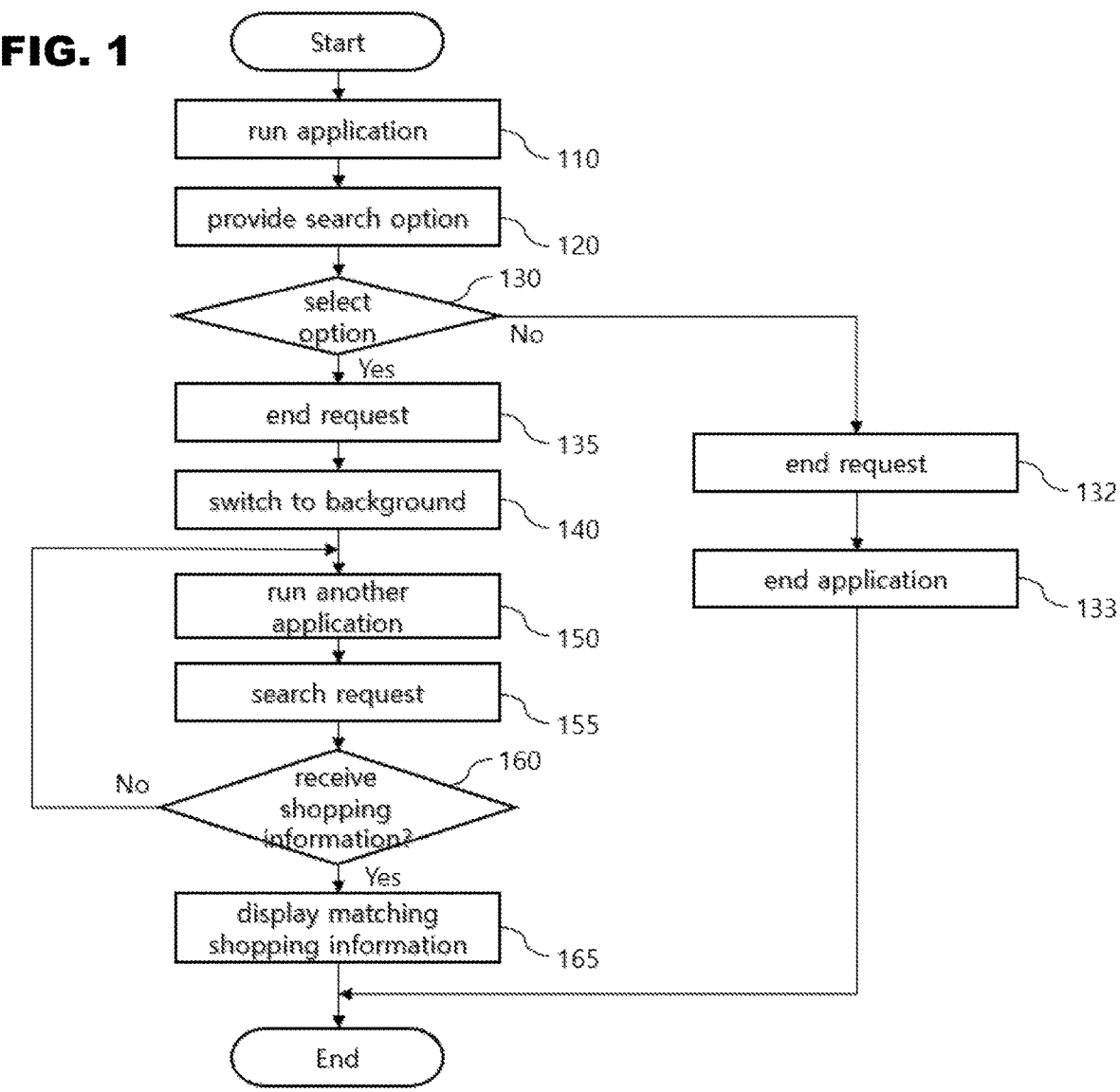
FIG. 1 is a flowchart illustrating that an electronic device displays search information according to an exemplary embodiment of the present invention.

It is obvious that the present invention is not limited to the embodiments described below and may include various modifications without departing from the technical idea of the present invention. In describing the embodiments, descriptions of technologies which are already known to those skilled in the art and are not directly related to the present invention may be omitted.

Like reference numerals refer to like elements throughout the accompanying drawings. Further, in the drawings, some elements may be exaggerated, omitted, or schematically illustrated, which is to clarify the gist of the present invention by omitting unnecessary descriptions not related to the gist of the present invention. Hereinafter, exemplary embodiments of the present invention will be described in detail with reference to the accompanying drawings.

FIG. 1 is a flowchart illustrating that an electronic device displays search information according to an exemplary embodiment of the present invention.

Although the following description is made assuming that the electronic device is a mobile device, the present invention is not limited thereto. That is, it should be understood that the electronic device according to the present invention includes any type of electronic device that is capable of requesting a product search and displaying search information, for example, a desktop, a smartphone, and a tablet PC.

Although the term 'background' may be used with various meanings in the IT industry, such a term may be construed to indicate that an application is running without displaying an execution screen in the present specification. Further, the term 'foreground' may be construed to indicate that an application is running with an execution screen being displayed.

Further, in the present specification, the term 'displayed page in an electronic device' may be construed to indicate a screen loaded on an electronic device to be immediately displayed on the screen by a user's scrolling and/or content in the loaded screen.

For example, the page may refer to the entire execution screen of an application that extends lengthwise in the horizontal or vertical direction and is displayed by a user's scrolling on a display of the mobile device and may also refer to a camera rolling screen. Further, the page may refer to a screen displayed on a web browser or an application screen.

From a different viewpoint, the page may also refer to a list view that sequentially displays, on the mobile device, items related to operations of a web search, an electronic book, a text chat service, and a mail list search through a multiple-line text, a bar, a box, an icon, or combinations thereof.

In operation 110 of FIG. 1, the electronic device may run an information search program according to an exemplary embodiment of the present invention. The search program may be an application, a plug-in, ActiveX, or an advertising SDK (module or API), which is installed in the mobile device, software installed in a desktop, or an extension program installed in a web browsing tool.

The program may be downloaded and installed by the electronic device from a service server and/or an application open market according to an exemplary embodiment of the present invention. Further, the program may be run as an advertising SDK (API or module) mounted in another application.

In operation 110, the electronic device may perform a process for user authentication and security with the installation of the application, and may also perform a procedure for offering user consent for the provision of information to the service server or a separate website server.

In operation 120, the electronic device may offer at least one or more search options through a setting menu of an application execution screen. The search options are for setting up a search mode.

According to the exemplary embodiment of the present invention, the search options may include a mode of automatically retrieving a relevant product and/or service without any user search request upon displaying random content on the electronic device, a mode of receiving a user search request through a search icon only when it is possible to retrieve displayed content, and/or a mode of conducting a product search only upon an explicit user search request.

In particular, an information search according to the exemplary embodiment of the present invention may be conducted without running a search application, opening a separate search page, or receiving an additional search term input. That is, according to the present invention, the search may be conducted with specific content being displayed without any separate action for a search. Various search modes according to exemplary embodiments of the present invention will be described below with reference to the accompanying drawings.

In operation 130, when a random search option is selected, the information search application according to the exemplary embodiment of the present invention is run in the background to conduct a search. For example, even though an application end command is received from a user (operation 135), the application according to the exemplary embodiment of the present invention may be run in the background, without being completely ended (operation 140), which is for conducting a search without any separate action for a search, for example, running the search application or displaying a search page.

When no search option is selected in operation 130, which is interpreted to mean that the user does not want an information search using the application (operation 132), the running application is ended according to an end command (operation 133).

In operation 150, the electronic device may run various other applications in the foreground while simultaneously running the search application in the background. In this case, the execution screens of the foreground applications may be displayed in a single layer or multiple layers.

In operation 155, the electronic device may conduct an information search for a related product and/or service while displaying random content. When the electronic device has sufficient resources, the electronic device may directly determine a matching product and/or service. Otherwise, the electronic device may conduct a search by transmitting a query to the service server that conducts an information search.

For example, when a search for a webpage is requested (that is, a search request is received while a web browser is running), the electronic device may transmit URL information on the displayed webpage via a search request query, or may extract text, image, and video data from a URL to transmit the extracted data via the query. Here, when it is impossible to acquire the URL information or to extract the text, image, and video data from the URL, the electronic device may acquire a screenshot of the webpage and may transmit the screenshot via the query.

According to another exemplary embodiment of the present invention, when a search request is received while an application other than a web browser is running, the electronic device may acquire a screenshot and/or data that can be uploaded on a relevant page and may transmit the screenshot or data to the service server via a search request query. For example, when a photo viewer application is running, the electronic device may transmit a photo file via the query. For another example, when a video player application is running, the electronic device may transmit a screenshot at a particular time via the query.

In operation 160, the electronic device may receive matching search information from the service server. For example, the service server may: extract an image, a video, or a text included in a query; retrieve a matching product from a database; and offer related shopping information. A specific example in which the service server determines a matching product will be described with reference to the accompanying drawings.

When the matching shopping information is received, the electronic device may switch the search application into the foreground to display the matching shopping information (operation 165). The shopping information may include related advertisement information, price information on a matching product/service, lowest price information, a lowest-price online store, similar goods, a coupon, and/or promotion information. Further, the shopping information may also include information on other products/services recommended based on a search record log of the user.

For example, when the user browses through a webpage including a flower image, the shopping information may display a flower delivery advertisement list, flower arrangement lesson promotion information, and/or rose festival discount coupon information according to the exemplary embodiment of the present invention.

For another example, when the user browses through an SNS including an image of shoes, the shopping image may display other shoes of the same brand as that of the shoes or shopping information on recommended shoes with the same or similar colors and shapes and/or for the same season according to the exemplary embodiment of the present invention.

For still another example, when the user browses through a picture including a toy image, the shopping image may display a toy name, a manufacturer, the year of manufacture, lowest price information, price variation information, an online store, product reviews, user age, and/or usage according to the exemplary embodiment of the present invention.

The information may be displayed as a text, an image, and/or an action script, each of which may be linked to an online store. In addition, the information may be displayed in a separate page or with an icon including a shopping information link around a relevant product on a page that the user is browsing through. Further, the information may be superposed on the page that the user is browsing through.

Figure 2:
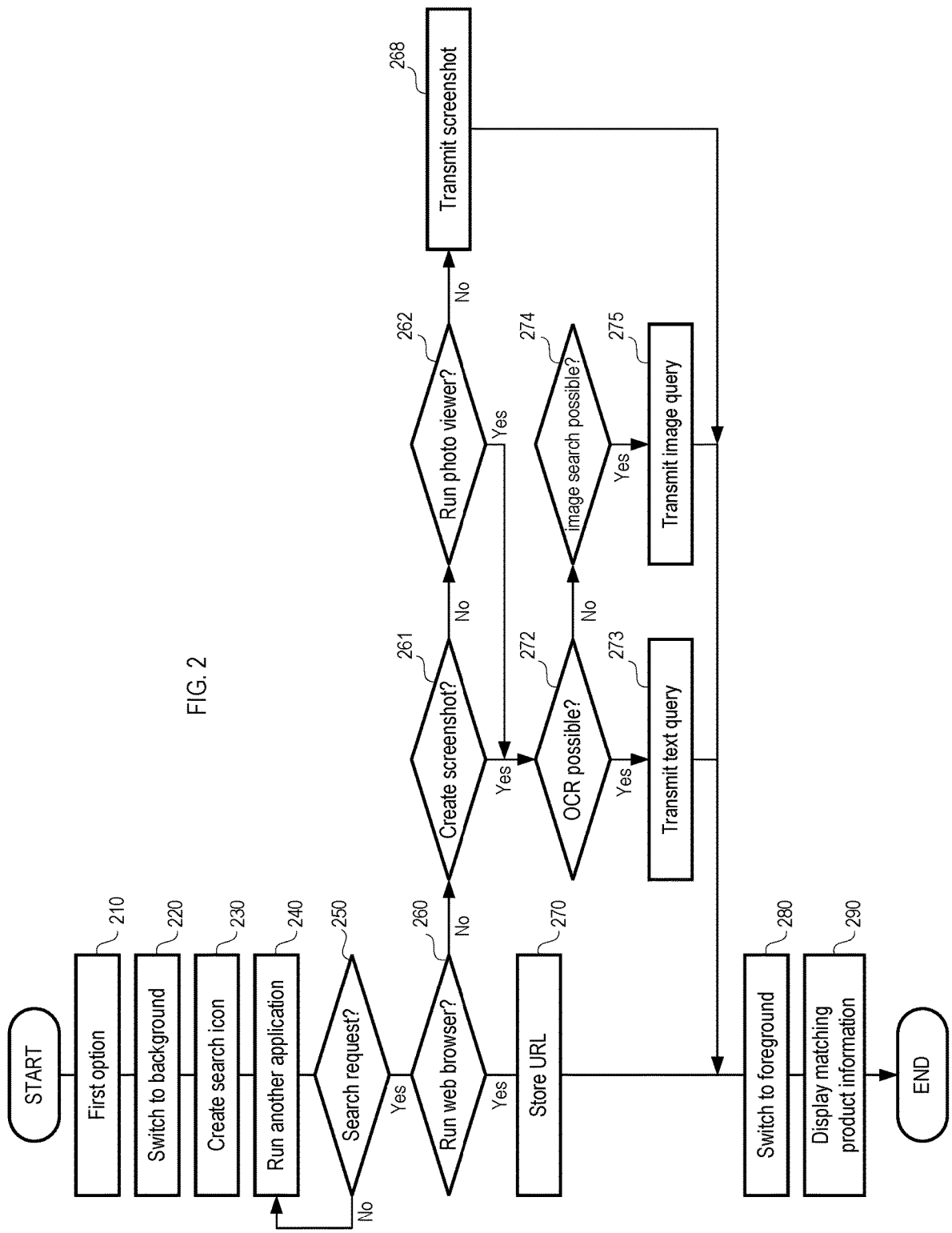
FIG. 2 illustrates a search method according to an exemplary embodiment of the present invention.

FIG. 2 illustrates a search method according to an exemplary embodiment of the present invention. In describing FIG. 2, overlapping details with those of FIG. 1 are omitted or are briefly mentioned.

According to the exemplary embodiment of FIG. 2, when there is a search request from a user, a query requesting a search is transmitted. In a mode according to this exemplary embodiment, when a search application is run in the background, a search icon is displayed in a notification list and/or a share menu list, and the user browsing through a specific page selects the search icon in the notification list and/or the share menu list to request a shopping information search for a product included in the page.

More specifically, when the foregoing mode is set as a search option in operation 210, the application may switch to background running (operation 220) and a shopping information search menu may be created in the notification list and/or the share menu list.

Particularly, when the search icon is included in the notification list, the shopping information search menu is preferably fixed in the notification list according to the purpose of the present technology. That is, the shopping information search menu may not be deleted even by a notification deactivation request from the user while the application is running in the background (operation 230).

In operation 240, the user may browse through a plurality of pages, content, and/or an application while running the application of the electronic device.

When the user wants a related shopping information search while browsing through a specific page, the user may import a notification window to select the search icon included in the notification list or may import a share menu to select the search icon included in the share list in operation 250. According to the exemplary embodiment of the present invention, the notification window or share menu including the search icon may be imported according to a conventional technology, which is to improve intuitiveness in a product search by using a user-friendly user interface (UI). A specific UI for displaying the search icon will be described with the accompanying drawings.

When the application running in the foreground is a web browser (operation 260), the electronic device may transmit a query including a record log of the web browser to a service server (operation 270). The record log may include a browsing execution history of the web browser. Particularly, the electronic device may transmit URL information on a webpage executed last, that is, URL information on a webpage browsed by the user right before selecting the search icon, via the query.

In operation 270, the electronic device may extract image, video, or text data included in the URL of the webpage and may transmit the extracted data via the query. Further, when it is impossible to extract the URL and the image, video, or text data, the electronic device may extract a screenshot and may transmit the screenshot to via the query.

According to another exemplary embodiment of the present invention, when a screenshot is created in the foreground (operation 261) or when the application running in the foreground is a photo viewer (operation 262), the electronic device may transmit a query. Particularly, regarding the screenshot, according to the exemplary embodiment of the present invention, the electronic device may transmit the very screenshot via the query, while the electronic device may extract a record log and may transmit the record log via the query, instead of the screenshot, when the web browser is running in the foreground.

For example, when the user browsing through a video wonders about the model name of a car frequently coming on the screen, the user may create a screenshot at the time the car is displayed and may import the notification window to create a product search icon. The screenshot may be created by a hardware key input matched to a corresponding function, a user gesture of touching an icon, or a user action of swiping across the screen or swinging the electronic device.

For another example, when the user shopping in a hypermarket may wonder about the online lowest price of a displayed telephone, the user may take a picture of the telephone using a camera application of the electronic device and may import the notification window to select the product search icon, with the picture displayed, thereby requesting a product search. Also, the user may input a share button, a shooting button, or a screenshot creation gesture with a camera preview screen displayed, instead of taking a picture of the telephone, thereby requesting a product search.

The electronic device may transmit an image including a screenshot or a picture and a URL of an image source via a query (operation 275). According to another exemplary embodiment of the present invention, the electronic device may convert objects of characters and/or numbers included in an image into texts using Optical Character Recognition (OCR) (operation 272) and may transmit a text query (operation 273).

According to still another exemplary embodiment of the present invention, the electronic device may first determine whether an image search is possible with respect to a target screenshot or a picture (operation 274), and may transmit an image query only when possible (operation 275).

For example, when a level of extracting feature information from an image is within a preset range, the electronic device may determine that the image search is possible. More specifically, the electronic device may extract, from the image, a feature descriptor for an interest point and/or features of the image, which is expressed in a vector value and may be used to determine similarities between images, and may determine that the image search is possible when the extracted feature information is within the preset range.

In FIG. 2, operations 272 to 275 are arbitrary operations for reducing loads for the server to retrieve a query and may be omitted. In this case, the electronic device may extract a screenshot of the foreground application and may transmit the screenshot via the query (operation 268) regardless of whether the user creates a separate screenshot.

Subsequently, when shopping information on a matching object is received from the service server in response to the query, the electronic device may switch the shopping information search application to run in the foreground in operation 280 and may display shopping information in operation 290.

Figure 3A:
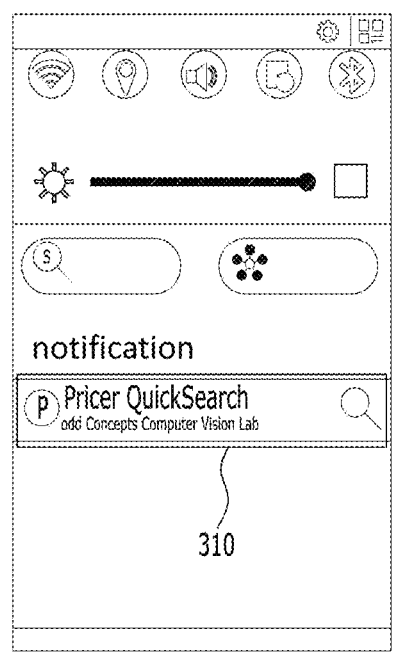
FIGS. 3A and 3B illustrate an example of a user interface displaying a search icon according to an exemplary embodiment of the present invention.
Figure 3B:
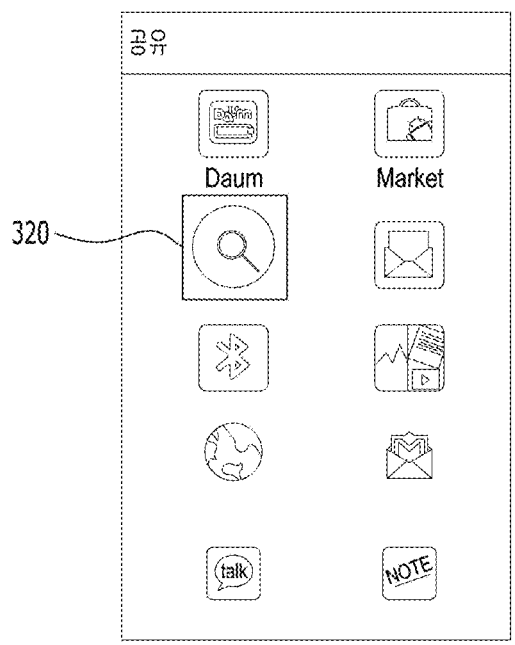

FIGS. 3A and 3B illustrate an example of a user interface displaying a search icon according to an exemplary embodiment of the present invention.

FIG. 3A illustrates a search icon 310 displayed in a notification list of a notification window according to an exemplary embodiment of the present invention.

For example, while browsing through a page, the user may input a drag starting from the top edge of a display to import the notification window illustrated in FIG. 3A, and may select the search icon 310 displayed in the notification list to request a search on the browsing page.

In particular, when the search icon is included in the notification list, the shopping information search menu is preferably fixed in the notification list according to the purpose of the present technology. That is, the shopping information search menu may not be deleted even by a notification deactivation request from the user while the application is running in the background.

FIG. 3B illustrates a search icon 320 displayed in a share list according to an exemplary embodiment of the present invention.

For example, while browsing through a page, the user may select a share menu to import the share list illustrated in FIG. 3B and may select the search icon displayed in the share list to request a search on the browsing page.

Figure 4:
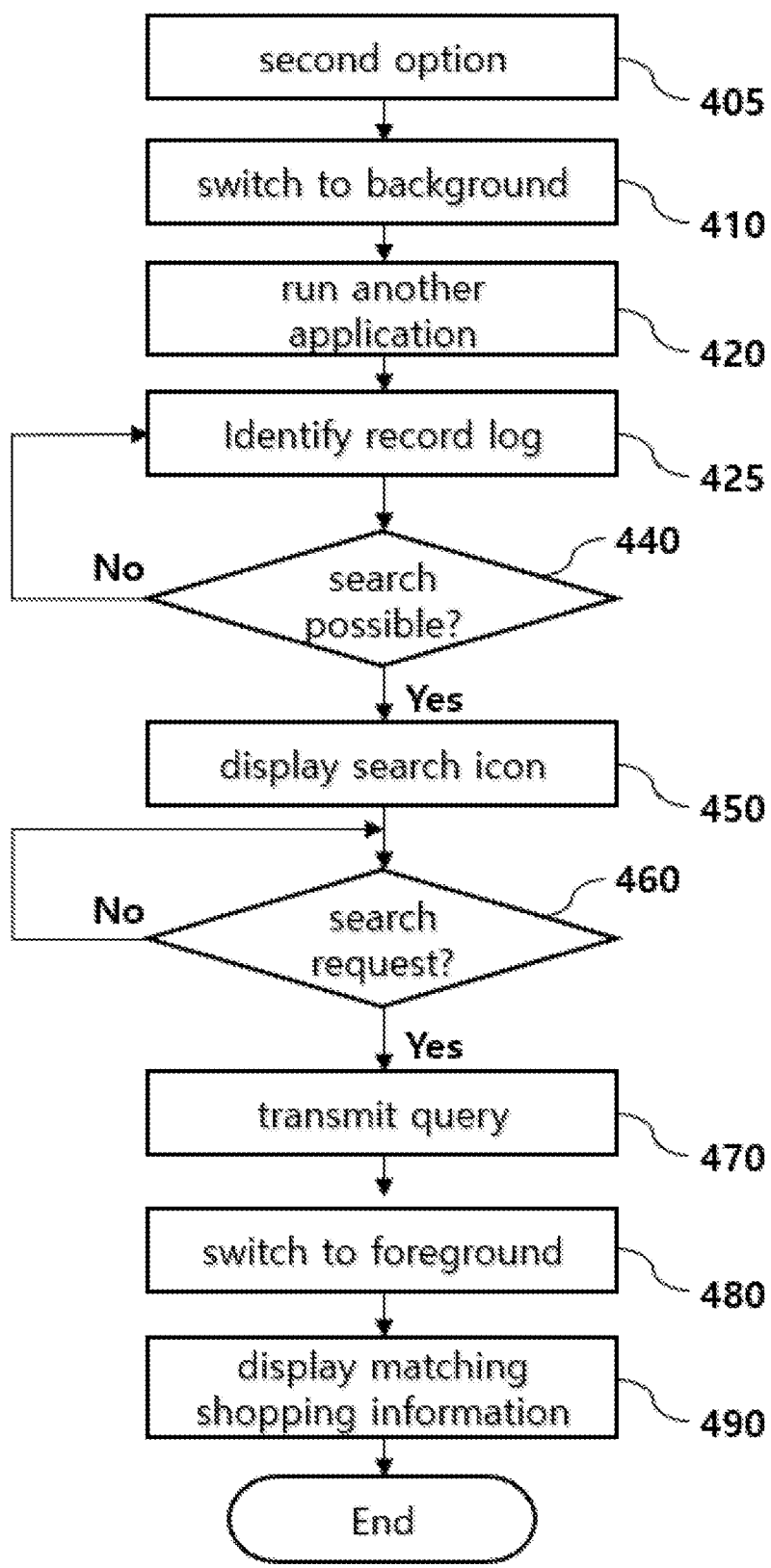
FIG. 4 illustrates a search method according to another exemplary embodiment of the present invention.

FIG. 4 illustrates a search method according to another exemplary embodiment of the present invention. In describing FIG. 4, overlapping details with those of FIG. 2 are omitted or are briefly mentioned.

In the exemplary embodiment of FIG. 4, the electronic device may first determine whether it is possible to retrieve a specific page, and may display a search icon only when possible. According to the exemplary embodiment, when a product search is possible, the electronic device notifies the user that the product search is possible using a search icon, and transmits a query only when the user selects the icon, thus reducing resources required for a server to transmit and process the query.

When the foregoing mode is set as a search option (operation 405), a search application may switch to background running (operation 410), and the user may browse through a plurality of pages while running other applications in operation 420.

According to the exemplary embodiment of the present invention, the search icon may be displayed only when it is possible to retrieve the page (operations 440 and 450).

For example, the electronic device may determine whether it is possible to retrieve content included in a displayed page using the number of images included in the page, the size of each image, the form of each image, a text of the page, image extraction possibility and/or the type and address of a URL and may display the search icon on the page only when possible.

For example, when the number of pieces of feature information extractable from an image is within a preset range, the electronic device may determine that an image search is possible and thus may display the search icon. More specifically, the electronic device may extract, from the image, a feature descriptor for an interest point and/or features of the image, which is expressed in a vector value and may be used to determine similarities between images, and may determine that the image search is possible when the extracted feature information is within the preset range.

For another example, when the application running in the foreground is a web browser, the electronic device may identify a record log, and may determine that a search is possible when one or more of a main URL of a browsing webpage, a subordinate URL, and a parameter of the subordinate URL is included in a preset target. For example, when the web browser is connected to a preset target page, the electronic device may determine that it is possible to retrieve the page and may display the search icon. The target page may be, for example, a product information detail page of an online shopping site.

A description on a user interface displaying a search icon will be described below in detail with reference to the accompanying drawings.

When the user selects the displayed search icon, a query about the page may be transmitted (operations 460 and 470). When matching shopping information is received in response to the query, the product search application may switch to foreground running and the received matching shopping information may be displayed (operations 480 and 490). Operations 470 to 490 are substantially the same as operations 260 to 290 described above in FIG. 2 and thus are briefly mentioned.

In the exemplary embodiment, a procedure for identifying whether it is possible to retrieve a product included in the page is essential. To reduce resources required for the procedure, the electronic device may periodically identify whether the web browser is running, may periodically identify the record log of the web browser when the web browser is running, and may identify whether it is possible to retrieve the product only when the web browser is updated (operation 425).

More specifically, the search application according to the exemplary embodiment of the present invention may periodically identify whether the web browser is running in the background, and may periodically identify the record log of the web browser when the web browser is running. In this manner, the search application may identify the possibility of a search only when the web browser is updated, instead of identifying the possibility of a search with respect to all webpages.

Figure 5A:
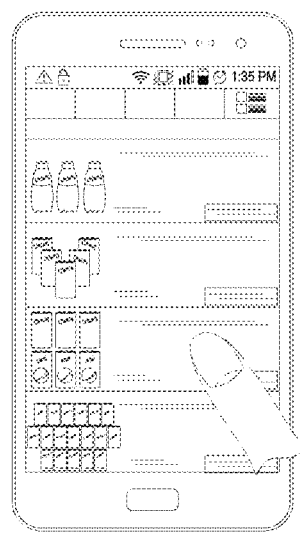
FIGS. 5A and 5B illustrate an example of a user interface displaying a search icon according to another exemplary embodiment of the present invention.
Figure 5B:
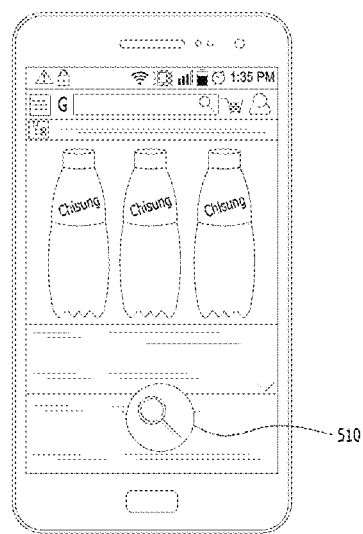

FIGS. 5A and 5B illustrate an example of a user interface displaying a search icon according to the search mode illustrated in FIG. 4.

As illustrated in FIG. 5A, according to the exemplary embodiment of the present invention, even though a page displays a plurality of products, when the page does not have a suitable format for a product search, no search icon is displayed.

However, when the user selects a specific object in FIG. 5A and thus a product specification page is displayed as in FIG. 5B, if the page has a suitable format for a search, the search icon 510 may be displayed.

According to this mode, when the search icon is displayed on a page that the user is browsing through, the user may recognize that it is possible to retrieve a corresponding product. Further, shopping information is immediately displayed upon selecting the search icon, and thus the icon may be considered as a link for importing a shopping information page.

Figure 6:
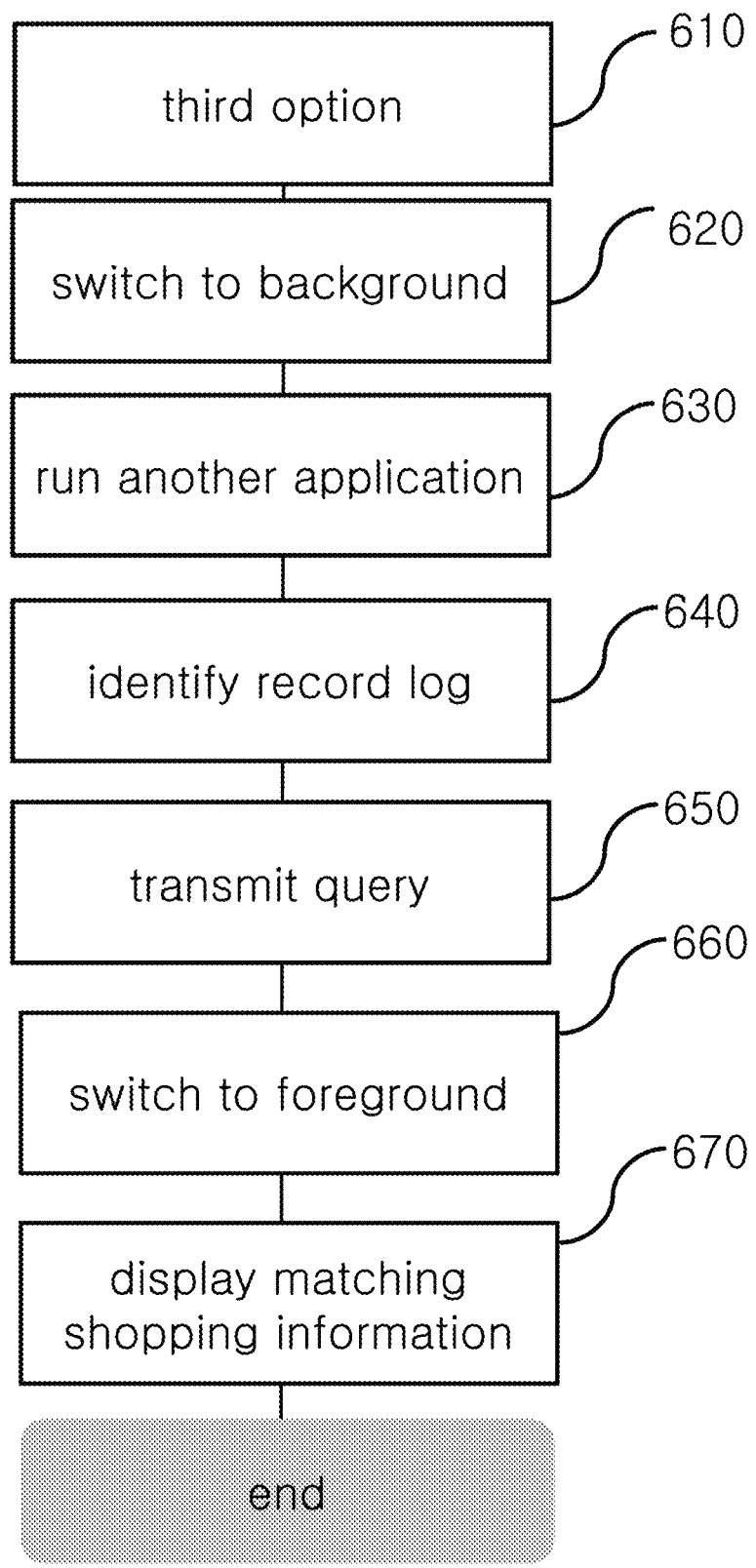
FIG. 6 illustrates a search method according to still another exemplary embodiment of the present invention.

FIG. 6 illustrates a search method according to another exemplary embodiment of the present invention. In describing FIG. 6, overlapping details with those of FIG. 2 to FIG. 4 are omitted or are briefly mentioned.

According to the search method of FIG. 6, a query for a shopping information search on a displayed page may be automatically transmitted without any type of user input requesting a search.

When the foregoing mode is set as a search option (operation 610), a search application may switch to background running (operation 620), and the user may browse through a plurality of pages while running other applications in operation 630.

For example, when the application running in the foreground is a web browser, a URL of a webpage may be transmitted via the query (operation 650), and a service server may determine a matching product and/or service using data offered through the URL.

Here, when the service server offers shopping information, the search application may switch to foreground running in operation 660 and the shopping information may be displayed in operation 670. Furthermore, according to the exemplary embodiment of the present invention, the shopping information may be displayed, being superposed on a query transmitting page, without changing a screen.

Here, even though the shopping information is received from the service server, the shopping information may be set to be displayed only when the users wants to display the shopping information. Operations 650 to 670 are substantially the same as operations 260 to 290 described above in FIG. 2 and thus are briefly mentioned.

In the exemplary embodiment, since the query is automatically transmitted, the electronic device may be set to transmit the query only when the web browser is updated.

More specifically, the search application according to the exemplary embodiment of the present invention may periodically identify whether the web browser is running in the background, and may periodically identify the record log of the web browser when the web browser is running (operation 640).

In this manner, the search application may transmit the query only when the web browser is updated, instead of identifying the possibility of a search with respect to all webpages (operation 650). Further, when matching shopping information is received in response to the query and is displayed (operation 670), if the record log of the browser is changed or the screen moves to the previous page from the query transmitting webpage, displaying the matching shopping information may be stopped.

Figure 7:
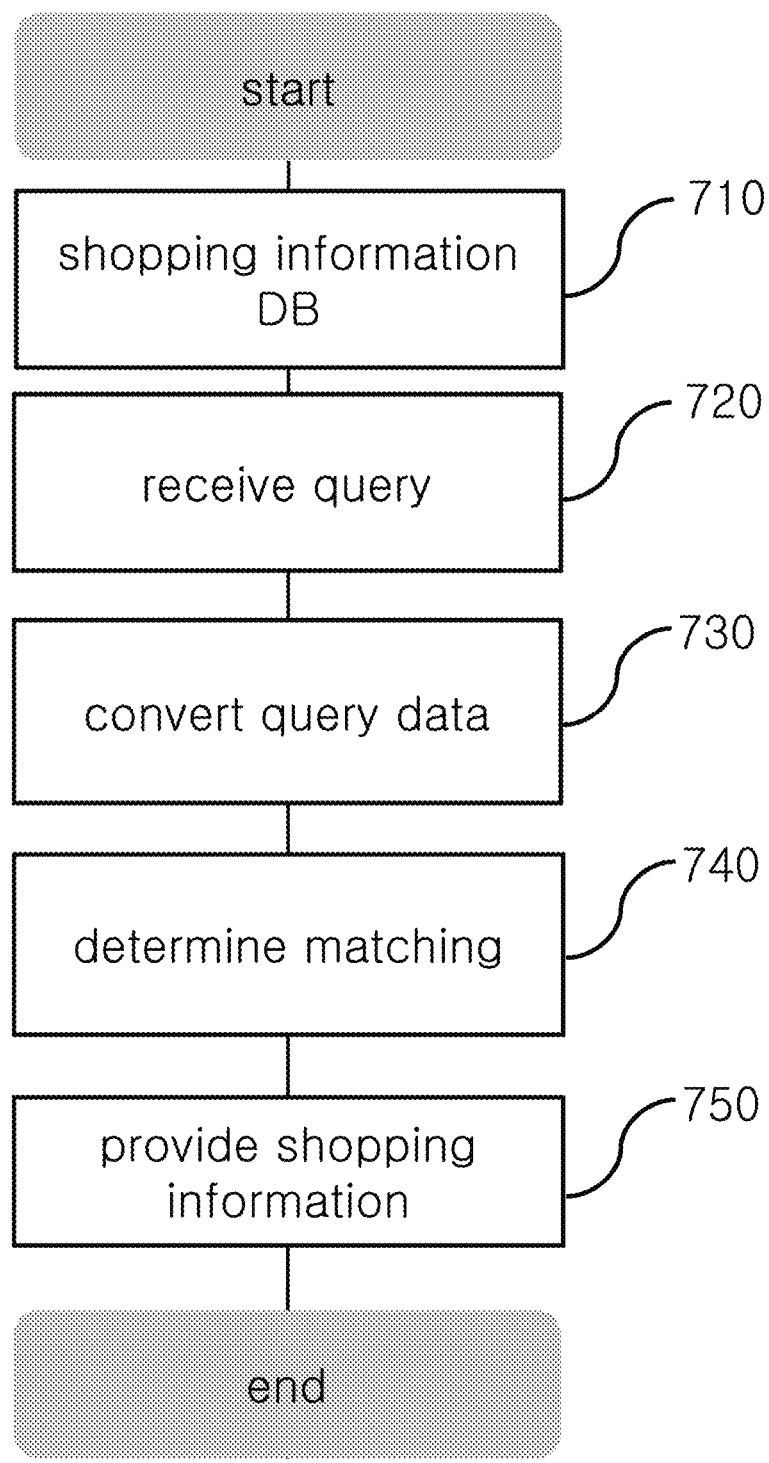
FIG. 7 illustrates that a service server offers search information according to an exemplary embodiment of the present invention.

FIG. 7 illustrates that a service server offers search information according to an exemplary embodiment of the present invention.

In operation 710, a shopping information offering server may create a shopping information database. The shopping information may include a product name, product images with different sizes from different angles, usage, product reviews, manufacturer information, store information, price information, advertising information, coupon information, and/or promotion information, and may also include a link to similar goods and recommended products based on a user record log. Methods for collecting the shopping information from different routes and for designing and storing the database may follow conventional techniques.

Further, the service server may generate feature information on product images stored in the database to create a database. For example, the service server may extract an interest point of a product image, may calculate a feature descriptor, and may index feature information on images to at least one or more categories for the efficiency in retrieval.

The service server may receive a query from an electronic device in operation 720, and may convert data included in the query in operation 730.

For example, when the query includes URL information, the service server may extract image, video, and/or text data offered by the URL and may select only data on a product.

Further, when the query includes image data, the service server may extract a unique value (hash information, header information, or the like) of an image from a query image and/or may extract feature information on the image to process the unique value or the feature information into an appropriate form for an image search. For example, the service server may convert a feature descriptor for the query image based on the same criterion as for indexing a feature descriptor for a database image, which is for quickly and efficiently performing a subsequent search process.

In operation 740, the service server may determine whether the query data is matched to a product and/or service included in the database.

For example, the service server may retrieve a set of feature descriptors for the database image to determine whether the distance between a feature descriptor vector value of the database image and a feature descriptor vector value of the query image is within a preset threshold. Further, the service server may determine the degree of consistency (geometric consistency) between the query image and the database image using attributes of the feature information, such as positional information, scale, rotation degree, and distribution information on the interest point or feature descriptor for the image, and may determine whether the degree of consistency is higher than a preset threshold to retrieve a matching product and/or service.

Although not shown in FIG. 7, the service server may apply deep learning or machine learning to a series of operations of FIG. 7.

For example, the service server may learn feature information extracted from random images to create a category, and may determine that the query image is matched to information belonging to the created specific category when a feature of the query image corresponds to the category.

In operation 750, the service server may offer shopping information on a matching product/service.

Figure 8:
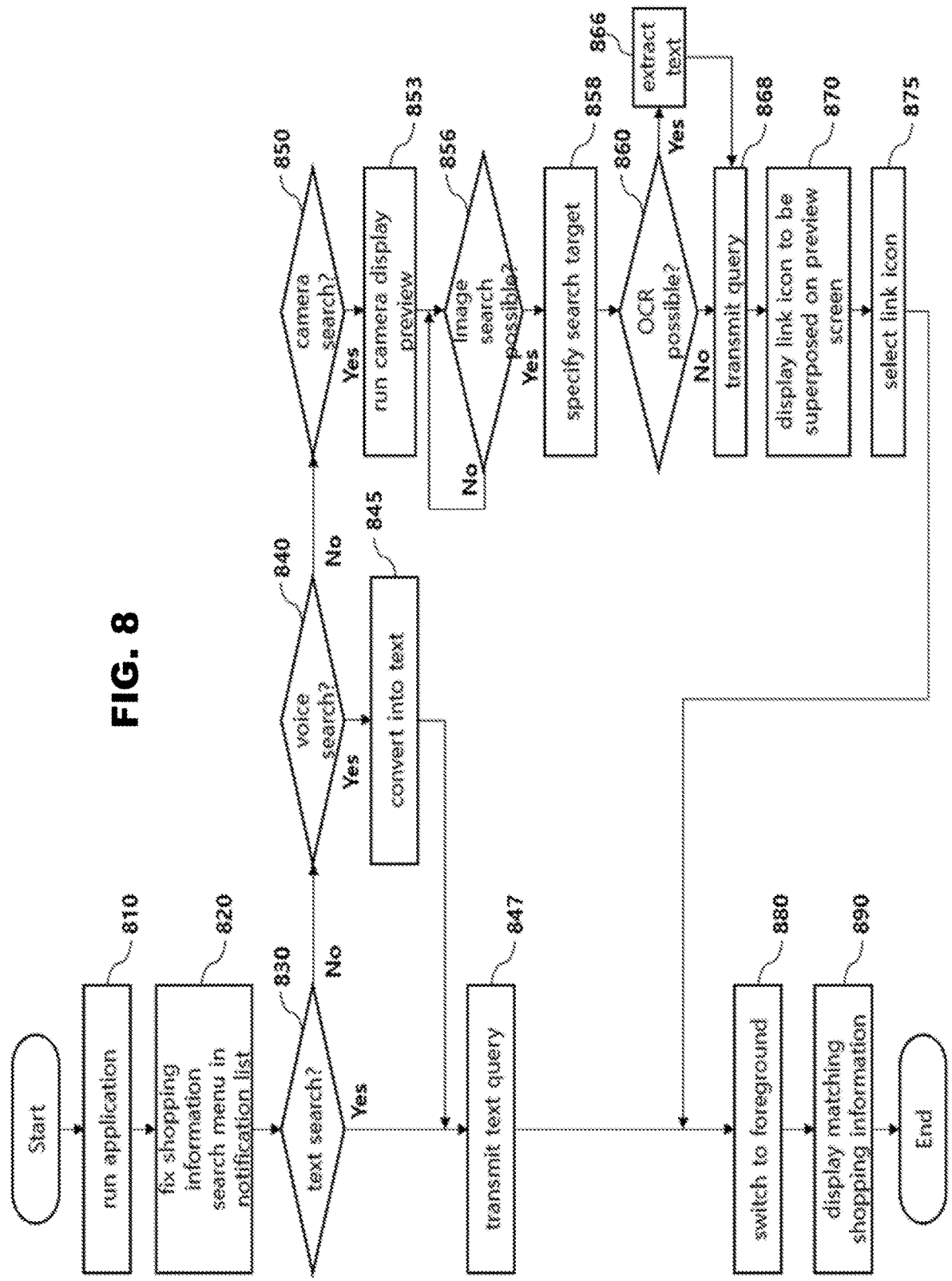
FIG. 8 illustrates a search method according to yet another exemplary embodiment of the present invention.

FIG. 8 illustrates a search method according to still another exemplary embodiment of the present invention. According to the exemplary embodiment of FIG. 8, the electronic device may offer a wider range of options, for example, a text search, a voice search, and a camera search, through a user interface for a shopping information search.

The exemplary embodiments described above in FIGS. 1 to 7 may illustrate a mode in which the electronic device requests a search relating to displayed content while displaying the content, while FIG. 8 may illustrate a mode in which content to be retrieved is imported upon a search request from the user.

In operation 810, the electronic device may run a shopping information search application according to the exemplary embodiment of the present invention, which may be running in the background despite an application end command from the user.

In operation 820, the electronic device may create a shopping information search menu in a notification list and/or a share menu list. In particular, when the shopping information search menu is included in the notification list, the shopping information search menu is preferably fixed in the notification list according to the purpose of the present technology. That is, the shopping information search menu may not be deleted even by a notification deactivation request from the user while the application is running in the background.

The shopping information search menu may include text search, voice search, and/or camera search options. A specific example of a user interface for the search menu according to the exemplary embodiment of the present invention will be described with reference to the accompanying drawings.

When the user selects a text search in operation 830, the electronic device may run a text input function to receive a text and may transmit the text via a query (operation 847).

For example, when the user directly inputs a text in a text search box in the shopping information search menu fixed in the notification list, the shopping information search application may transmit the input text via the query in the background.

For another example, when the user selects the text search box in the shopping information search menu, the shopping information application according to the exemplary embodiment of the present invention switches from background running to foreground running and may display a text input box of the application. Subsequently, when the user inputs a text in the text input window of the application, the application may transmit the input text via the query.

When the user selects a voice search in operation 840, the electronic device may run a voice input function to receive a voice, may convert the voice into a text (operation 845), and may transmit a text query (operation 847).

For example, when the user selects a voice search box in the shopping information search menu fixed in the notification list, a microphone function may be activated and the user may input a voice through a microphone. The shopping information search application running in the background may convert the input voice into a text and may transmit the converted text via the query.

For another example, when the user selects the voice search box in the shopping information search menu, the shopping information application according to the exemplary embodiment of the present invention switches from background running to foreground running and the microphone function may be activated. Next, the shopping information search application running in the foreground may convert an input voice into a text and may transmit the converted text via the query.

When the user selects a camera search in operation 850, the electronic device may run a camera function to display a preview (operation 853).

Here, the electronic device may determine whether an image search is possible from a preview image (operation 856) and may specify a search target (operation 858). Particularly, according to the exemplary embodiment of the present invention, the electronic device may specify a search target regardless of whether a capture image of a preview screen is created.

Although FIG. 8 shows that operation 856 is followed by operation 858, the present invention is not limited thereto.

That is, operation 856 and operation 858 may be performed separately or in reverse order.

For example, when a stable shooting environment is expected with reference to sensor values from an acceleration sensor or an illumination sensor, the electronic device may determine that the image search is possible and may transmit a query about a preview image at a corresponding time, instead of creating a separate preview image.

For another example, the electronic device may capture a preview screen at a corresponding time when receiving an input via a shooting button or according to a preset period, may determine whether an image search is possible from the captured image, and may transmit an image query only when possible.

For example, when the number of pieces of feature information extractable from the preview screen is within a preset range, the electronic device may determine that an image search is possible. More specifically, the electronic device may extract, from a preview screen at a specific time or the captured preview screen, a feature descriptor for an interest point and/or features of the image, which is expressed in a vector value and may be used to determine similarities between images, and may determine that the image search is possible when the extracted feature information is within the preset range.

The electronic device may convert objects of characters and/or numbers included in the captured image into texts using image processing and may transmit a text query (operations 860, 866, and 868). An image query may be transmitted along with the text query.

Operations 856 to 866 of FIG. 8 are arbitrary operations for reducing loads for the server to retrieve a query and may be omitted.

Subsequently, when shopping information on a matching object is received from the service server in response to the query, the electronic device may display a link icon to the shopping information to be superposed on the preview screen in operation 870. The link icon includes a keyword relating to an image and/or a matching product, a service, or an advertisement.

When the user selects the link icon, the application may switch into the foreground to display the matching shopping information (operations 880 and 890). The shopping information may include related advertisement information, price information on a matching product/service, lowest price information, a lowest-price online store, similar goods, a coupon, and/or promotion information. Further, the shopping information may also include information on other products/services recommended based on a search record log of the user.

Figure 9A:
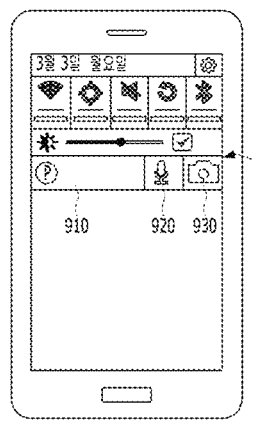
FIGS. 9A, 9B and 9C illustrate an example of a user interface displaying a search menu according to another exemplary embodiment of the present invention.
Figure 9B:
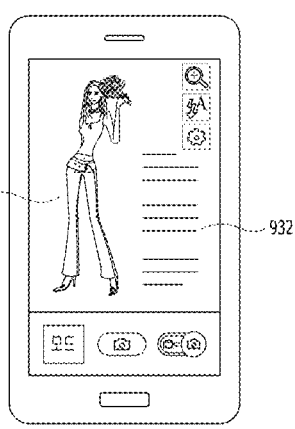
Figure 9C:
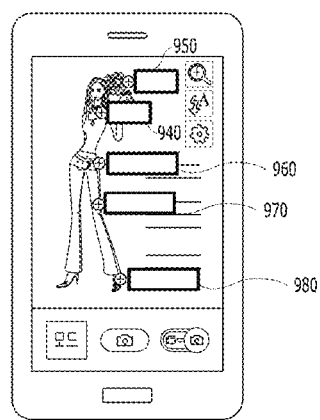

FIGS. 9A, 9B and 9C illustrate an example of a user interface that displays a search menu in a notification list and displays a link icon to be superposed on a preview screen according to the foregoing embodiment of FIG. 8.

For example, the user may import a notification window by inputting a drag starting from the top edge of a display as illustrated in FIG. 9A and may select a search mode by selecting the search menu 905 displayed in the notification list. The shopping information search menu may include options of a text search 910, a voice search 920, and/or a camera search 930.

For example, when the user selects the camera option, the electronic device may import a camera function and may display a preview image as illustrated in FIG. 9B. FIG. 9B illustrates a specific page of a fashion magazine captured by a camera. Here, when a stable shooting environment is expected with reference to sensor values from an acceleration sensor or an illumination sensor, the electronic device may transmit a query about a preview screen.

In the example of FIG. 9B, the preview image may be divided into sections 936 and 932. Particularly, when section 932 is an object of characters and/or numbers, the electronic device may process section 932 using OCR to extract a text according to the exemplary embodiment of the present invention. In this case, the electronic device may transmit an image query about section 936 and a text query about section 932 together or separately.

When shopping information on a matching object is received from the service server in response to the queries, the electronic device may display a link icon to the matching shopping information to be superposed on the preview screen as illustrated in FIG. 9C. In the example of FIG. 9C, the link icon may be displayed with a keyword relating to a byname 940 of a matching product, fashion information 960, discount information 970, similar goods information 980, or related advertisement information 950.

When the user selects the link icon, the application may switch into the foreground to display specific matching shopping information.

The embodiments of the present invention disclosed herein and shown in the drawings are merely specific examples presented in order to easily describe technical details of the present invention and to help the understanding of the present invention, and are not intended to limit the scope of the present invention. It will be apparent to those having ordinary knowledge in the technical field, to which the present invention pertains, that it is possible to practice other modified embodiments based on the technical idea of the present invention as well as the embodiments disclosed herein.

The invention claimed is:

1. A method for providing shopping information, which is performed by an electronic device, the method comprising:

running, by the electronic device, a shopping information search application in a background state;

in response to the shopping information search application running, creating, by the electronic device, a shopping information search menu that is included in a notification list of the electronic device;

receiving, by the electronic device, a user request for a camera search in the shopping information search menu;

running a camera function to thereby display a camera preview image, upon receiving the user request for the camera search in the shopping information search menu;

expecting, by the electronic device, a stable shooting environment by referencing sensor values from an acceleration sensor or an illumination sensor;

in response to the stable shooting environment, capturing, by the electronic device, the camera preview image and generating a capture image;

determining, by the electronic device, that an image search is possible by extracting feature information from the camera preview image until a level of extracting feature information from the camera preview image is within a preset range;

converting, by the electronic device, objects of characters or numbers comprised in the capture image into a text;

transmitting, by the electronic device to a service server, a query including one or more of the text and the capture image;

receiving, by the electronic device from the service server, shopping information matched to the query; and switching the shopping information search application from the background state into a foreground state upon receiving the shopping information and displaying the shopping information on a screen, wherein the creating of the shopping information search menu comprises creating the shopping information search menu including one or more search options that are included in the notification list, the one or more search options including the camera search, a text search, and a voice search.

2. The method of claim 1, wherein the method further comprises:

receiving, by the electronic device, a user request for the text search in the shopping information search menu or a user request for the voice search in the shopping information search menu;

in response to the user request for the text search, running, by the electronic device, a text input function and transmitting a shopping information search request query about an input text; and in response to the user request for the voice search, running, by the electronic device, a voice input function, converting an input voice into a text, and transmitting a shopping information search request query about the converted text.

3. A non-transitory computer-readable media having stored thereon a program that, when executed, causes a processor to perform operations comprising:

running a shopping information search application in a background state;

in response to the shopping information search application running, creating a shopping information search menu that is included in a notification list of the electronic device;

receiving a user request for a camera search in the shopping information search menu;

running a camera function to thereby display a camera preview image, upon receiving the user request for the camera search in the shopping information search menu;

expecting a stable shooting environment by referencing sensor values from an acceleration sensor or an illumination sensor;

in response to the stable shooting environment, capturing the camera preview image and generating a capture image;

determining that an image search is possible by extracting feature information from the camera preview image until a level of extracting feature information from the camera preview image is within a preset range;

converting objects of characters or numbers comprised in the capture image into a text;

transmitting a query including one or more of the text and the captured image to a service server;

receiving shopping information matched to the query from the service server; and switching the shopping information search application from the background state into a foreground state upon receiving the shopping information and displaying the shopping information on a screen, wherein the creating of the shopping information search menu comprises creating the shopping information search menu including one or more search options that are included in the notification list, the one or more search options including the camera search, a text search, and a voice search.

4. The method of claim 1, wherein, when a screenshot is generated at a time upon receiving the user request for the camera search in the shopping information search menu, transmitting the query comprises transmitting, to the service server, a query including the screenshot, and the method further comprises displaying a link to the shopping information to be superposed on a screen displaying at a time upon receiving the shopping information.

5. The non-transitory computer-readable media of claim 3, wherein, when a screenshot is generated at a time upon receiving the user request for the camera search in the shopping information search menu, transmitting the query comprises transmitting a query including the screenshot, and the computer program further comprises displaying a link to the shopping information to be superposed on a screen displaying at a time upon receiving the shopping information.

6. The non-transitory computer-readable media of claim 3, wherein the processor executable program further causes the processor to perform operations comprising:

receiving a user request for the text search in the shopping information search menu or a user request for the voice search in the shopping information search menu;

in response to the user request for the text search, running a text input function and transmitting a shopping information search request query about an input text; and in response to the user request for the voice search, running a voice input function, converting an input voice into a text, and transmitting a shopping information search request query about the converted text.

* * * * *